(12) United States Patent
Lee et al.

(10) Patent No.: US 7,249,933 B2
(45) Date of Patent: Jul. 31, 2007

(54) FUNNEL FILLET TURBINE STAGE

(75) Inventors: Ching-Pang Lee, Cincinnati, OH (US);
Jan Christopher Schilling, Middletown, OH (US); Aspi Rustom Wadia, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/035,866

(22) Filed: Jan. 10, 2005

(65) Prior Publication Data
US 2006/0153681 A1 Jul. 13, 2006

(51) Int. Cl.
F01D 5/18 (2006.01)

(52) U.S. Cl. ............... 416/97 R; 416/193 A

(58) Field of Classification Search .............. 416/97 R, 416/193 A
See application file for complete search history.

(56) References Cited

U.S. PATENT DOCUMENTS

| | | | |
|---|---|---|---|
| 4,194,869 A | 3/1980 | Corcokios | |
| 4,778,338 A | 10/1988 | Bessay | |
| 4,832,567 A | 5/1989 | Bessay | |
| 5,340,278 A * | 8/1994 | Magowan | ............... 416/96 R |
| 5,382,135 A | 1/1995 | Green | |
| 5,397,215 A | 3/1995 | Spear et al. | |
| 5,954,475 A | 9/1999 | Matsuura et al. | |
| 6,017,186 A | 1/2000 | Hoeger et al. | |
| 6,190,128 B1 * | 2/2001 | Fukuno et al. | ............ 416/96 R |
| 6,283,713 B1 | 9/2001 | Harvey et al. | |
| 6,338,609 B1 | 1/2002 | Decker et al. | |
| 6,341,939 B1 | 1/2002 | Lee | |
| 6,354,797 B1 | 3/2002 | Heyward et al. | |
| 6,419,446 B1 | 7/2002 | Kvasnak et al. | |
| 6,511,294 B1 | 1/2003 | Mielke et al. | |
| 6,561,761 B1 | 5/2003 | Decker et al. | |
| 6,669,445 B2 | 12/2003 | Staubach et al. | |
| 6,719,529 B2 | 4/2004 | Tiemann | |
| 6,830,432 B1 | 12/2004 | Scott et al. | |
| 6,969,232 B2 * | 11/2005 | Zess et al. | ............... 415/191 |
| 2004/0081548 A1 | 4/2004 | Zess et al. | |
| 2004/0109765 A1 | 6/2004 | Benedetti et al. | |

FOREIGN PATENT DOCUMENTS

| | | |
|---|---|---|
| CH | 229266 | 1/1944 |
| FR | 1602965 | 4/1971 |
| JP | 58-32903 | 2/1983 |

OTHER PUBLICATIONS

Patent Abstract of Japan, vol. 007, No. 112 (M-215), May 17, 1983, European Patent Office, publication No. 58032903, pub. Date Feb. 26, 1983, single page.
U.S. Appl. No. 11/010,688, filed Dec. 13, 2004, "Fillet Energized Turbine Stage," Ching-Pang Lee.
U.S. Appl. No. 11/022,121, filed Dec. 24, 2004, "Scalloped Surface Turbine Stage," A. Tam et al.
Harvey et al, "Non-Asxisymmetric Turbine End Wall Design: Part 1 Three Dimensional Linear Design System," ASME 99-GT-337, Jun. 1999, pp. 1-9.
U.S. Patent Application No., filed Dec. 13, 2004, "Fillet Energized Turbine Stage," Ching-Pang Lee [Appln No. unknown at this filing, GE158088].
U.S. Patent Application No., filed Dec. 24, 2004, filed Dec. 24, 2004, "Scalloped Surface Turbine Stage ," A. Tam et al [Appln No. unknown at this filing, GE161855].

* cited by examiner

*Primary Examiner*—Ninh H. Nguyen
(74) *Attorney, Agent, or Firm*—William S. Andes; Francis L. Conte

(57) ABSTRACT

A turbine stage includes a row of airfoils and their platforms spaced laterally apart to define flow passages therebetween. Each airfoil is integrally joined to its platform at a funnel-shaped fillet along the pressure side of the airfoil which decreases in size from the leading edge towards the trailing edge. A field of film cooling holes extends through the platform along the fillet for discharging film cooling air.

30 Claims, 3 Drawing Sheets

FUNNEL FILLET TURBINE STAGE

BACKGROUND OF THE INVENTION

The present invention relates generally to gas turbine engines, and, more specifically, to turbines therein.

In a gas turbine engine air is pressurized in a compressor and mixed with fuel in a combustor for generating hot combustion gases. Turbine stages extract energy from the combustion gases to power the compressor, while also powering an upstream fan in a turbofan aircraft engine application, or powering an external drive shaft for marine and industrial applications.

A high pressure turbine (HPT) immediately follows the combustor and includes a stationary turbine nozzle which discharges combustion gases into a row of rotating first stage turbine rotor blades extending radially outwardly from a supporting rotor disk. The HPT may include one or more stages of rotor blades and corresponding turbine nozzles.

Following the HPT is a low pressure turbine (LPT) which typically includes multiple stages of rotor blades and corresponding turbine nozzles.

Each turbine nozzle includes a row of stator vanes having radially outer and inner endwalls in the form of arcuate bands which support the vanes. Correspondingly, the turbine rotor blades include airfoils integrally joined to radially inner endwalls or platforms supported in turn by corresponding dovetails which mount the individual blades in dovetail slots formed in the perimeter of the supporting rotor disk. An annular shroud surrounds the radially outer tips of the rotor airfoils in each turbine stage.

The stator vanes and rotor blades have corresponding airfoils including generally concave pressure sides and generally convex suction sides extending axially in chord between opposite leading and trailing edges. Adjacent vanes and adjacent blades form corresponding flow passages therebetween bound by the radially inner and outer endwalls.

During operation, the combustion gases are discharged from the combustor and flow axially downstream through the respective flow passages defined between the stator vanes and rotor blades. The aerodynamic contours of the vanes and blades, and corresponding flow passages therebetween, are precisely configured for maximizing energy extraction from the combustion gases which in turn rotate the rotor from which the blades extend.

The complex three-dimensional (3D) configuration of the vane and blade airfoils is tailored for maximizing efficiency of operation, and varies radially in span along the airfoils as well as axially along the chords of the airfoils between the leading and trailing edges. Accordingly, the velocity and pressure distributions of the combustion gases over the airfoil surfaces as well as within the corresponding flow passages also vary.

Undesirable pressure losses in the combustion gas flowpaths therefore correspond with undesirable reduction in overall turbine efficiency. For example, the combustion gases enter the corresponding rows of vanes and blades in the flow passages therebetween and are necessarily split at the respective leading edges of the airfoils.

The locus of stagnation points of the incident combustion gases extends along the leading edge of each airfoil, and corresponding boundary layers are formed along the pressure and suction sides of each airfoil, as well as along each radially outer and inner endwall which collectively bound the four sides of each flow passage. In the boundary layers, the local velocity of the combustion gases varies from zero along the endwalls and airfoil surfaces to the unrestrained velocity in the combustion gases where the boundary layers terminate.

One common source of turbine pressure losses is the formation of horseshoe vortices generated as the combustion gases are split in their travel around the airfoil leading edges. A total pressure gradient is effected in the boundary layer flow at the junction of the leading edge and endwalls of the airfoil. This pressure gradient at the airfoil leading edges forms a pair of counterrotating horseshoe vortices which travel downstream on the opposite sides of each airfoil near the endwall.

The two vortices travel aft along the opposite pressure and suction sides of each airfoil and behave differently due to the different pressure and velocity distributions therealong. For example, computational analysis indicates that the suction side vortex migrates away from the endwall toward the airfoil trailing edge and then interacts following the airfoil trailing edge with the pressure side vortex flowing aft thereto.

The interaction of the pressure and suction side vortices occurs near the midspan region of the airfoils and creates total pressure loss and a corresponding reduction in turbine efficiency. These vortices also create turbulence and increase undesirable heating of the endwalls.

For example, the vortices can disrupt film cooling air along the platform surface, and reduce the cooling effectiveness thereof. More film cooling holes may therefore be required to improve cooling performance, which in turn increases cooling air requirements and decreases turbine efficiency.

Since the horseshoe vortices are formed at the junctions of turbine rotor blades and their integral root platforms, as well at the junctions of nozzle stator vanes and their outer and inner bands, corresponding losses in turbine efficiency are created, as well as additional heating of the corresponding endwall components.

Accordingly, it is desired to provide an improved turbine stage for reducing horseshoe vortex affects.

BRIEF DESCRIPTION OF THE INVENTION

A turbine stage includes a row of airfoils and their platforms spaced laterally apart to define flow passages therebetween. Each airfoil is integrally joined to its platform at a funnel-shaped fillet along the pressure side of the airfoil which decreases in size from the leading edge towards the trailing edge. A field of film cooling holes extends through the platform along the fillet for discharging film cooling air.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
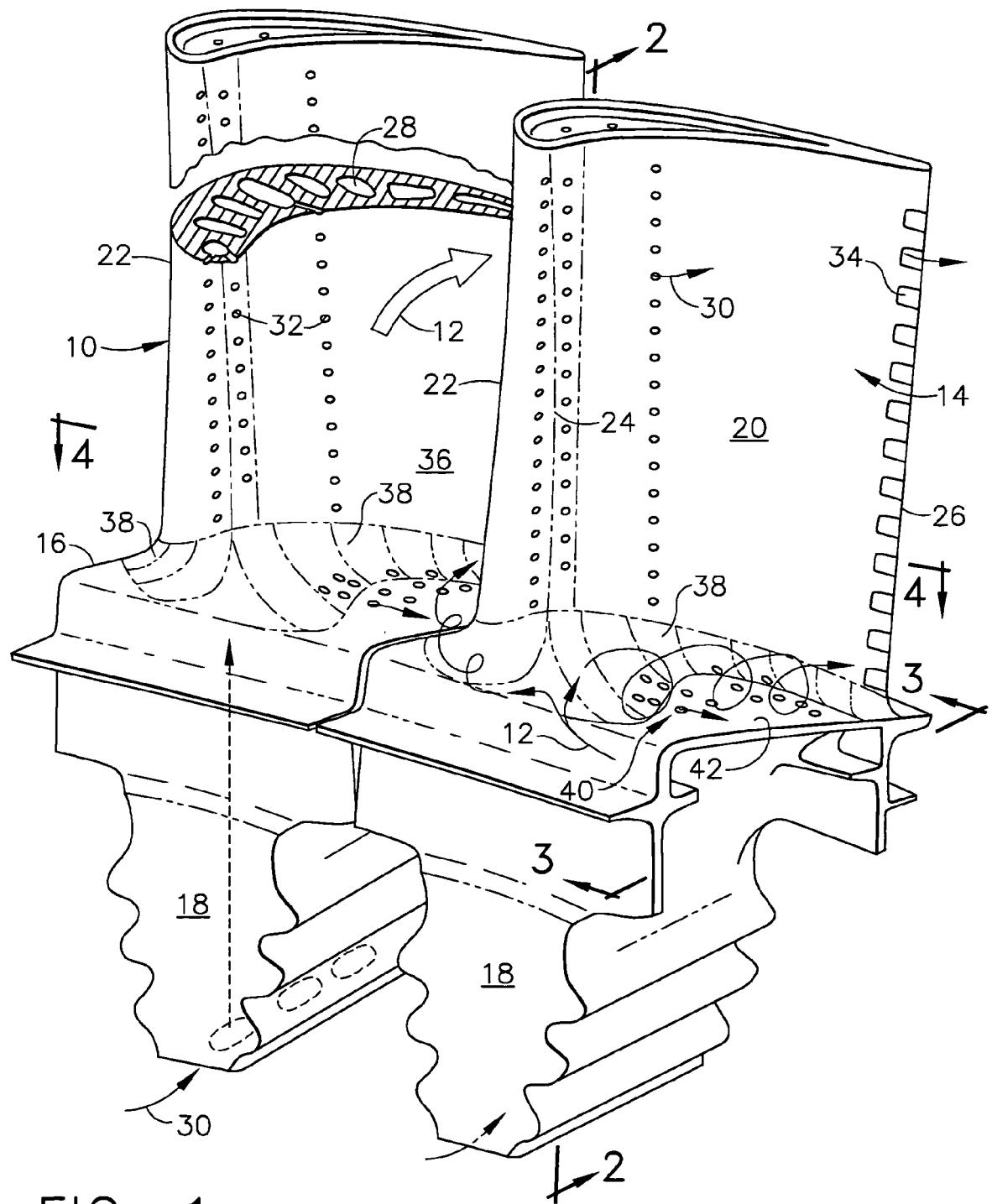
FIG. 1 is an isometric view of two adjacent rotor blades in the first stage of a high pressure turbine.

Illustrated in FIG. 1 are two exemplary first stage turbine rotor blades 10 which circumferentially adjoin each other in a full row thereof in a corresponding turbine stage of a gas turbine engine. As indicated above, combustion gases 12 are formed in a conventional combustor (not shown) and discharged in the axial downstream direction through the row of turbine blades 10 which extract energy therefrom for powering a supporting rotor disk (not shown) on which the blades are mounted.

The turbine stage includes a complete row of the blades, with each blade having a corresponding airfoil 14 integrally joined at a root end to a corresponding radially inner endwall or platform 16. Each platform is in turn integrally joined to a corresponding axial-entry dovetail 18 conventionally configured for supporting the corresponding turbine blade in the perimeter of the rotor disk.

Each airfoil includes a generally concave pressure side 20 and a circumferentially or laterally opposite, generally convex suction side 22 extending axially in chord between opposite leading and trailing edges 24, 26. The two edges extend radially in span from root to tip of the airfoil.

Figure 2:
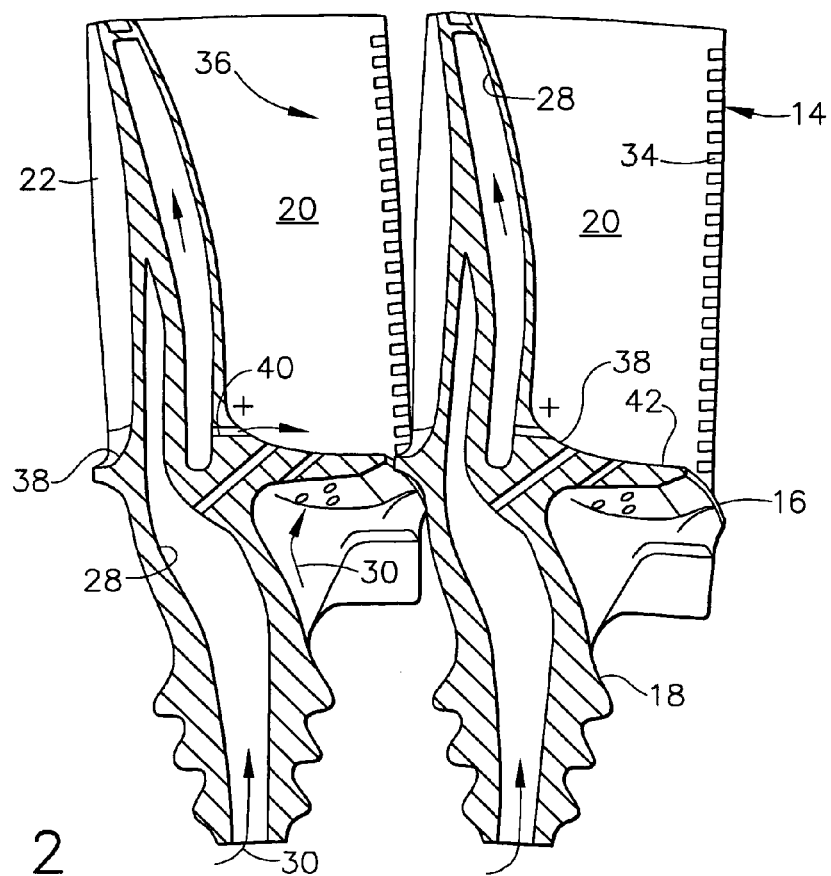
FIG. 2 is an elevational sectional view through the turbine blades illustrated in FIG. 1 and taken along line 2—2.

As shown in FIGS. 1 and 2, each airfoil is hollow and includes an internal cooling circuit 28 bound by the opposite pressure and suction sides. The cooling circuit may have any conventional configuration and includes inlet channels extending through the platform and dovetail for receiving cooling air 30 bled from the compressor of the engine (not shown).

The cooling air is typically discharged from each airfoil through several rows of film cooling holes 32 located where desired on the pressure and suction sides of the airfoil, and typically concentrated near the leading edge thereof. Each airfoil typically also includes a row of trailing edge cooling holes 34 which emerge through the pressure side of the airfoil just before the thin trailing edge thereof.

The exemplary turbine blades illustrated in FIGS. 1 and 2 may have any conventional configuration of the airfoil, platform, and dovetail for extracting energy from the combustion gases 12 during operation. As indicated above, the platform 16 is integrally joined to the root end of the airfoil and defines the radially inner flow boundary for the combustion gases 12.

The blades are mounted in a row around the perimeter of the rotor disk, with the adjacent airfoils 14 being spaced circumferentially or laterally apart to define therebetween flow passages 36 for channeling the combustion gases 12 axially in the downstream direction during operation.

Each inter-airfoil flow passage 36 in the turbine stage illustrated in FIGS. 1 and 2 is therefore defined and bounded by the pressure side 20 of one airfoil, the suction side 22 of the next adjacent airfoil, the corresponding pressure and suction side portions of the adjacent platforms 16, and the radially outer turbine shroud (not shown) which surrounds the radially outer tip ends of the airfoils in the complete row of turbine blades.

As indicated above in the Background section, the combustion gases 12 flow through the corresponding flow passages 36 during operation and are necessarily split by the individual airfoils 14. The high velocity combustion gases are circumferentially split at the corresponding airfoil leading edges 24 with a stagnation pressure thereat, and with the formation of corresponding boundary layers along the opposite pressure and suction sides of the airfoil.

Furthermore, the combustion gases also form a boundary layer along the individual blade platforms 16 as the gases are split around the airfoil leading edge at its juncture with the platform.

Accordingly, the split combustion gas flow along the blade platforms results in a pair of counterrotating horseshoe vortices which flow axially downstream through the flow passages along the opposite pressure and suction sides of each airfoil. These horseshoe vortices create turbulence in the boundary layers, and migrate radially outwardly toward the mid-span regions of the airfoils and create losses of total pressure and reduce turbine efficiency. These vortices also affect the ability to cool the platform outer surface.

In order to reduce these adverse affects of the horseshoe vortices, each platform 16 is integrally joined to the root end of each airfoil at a relatively large arcuate fillet 38 specifically configured to change the contour of the endwall or platform 16 to improve aerodynamic efficiency. Since the pressure and suction sides of the airfoil are differently configured for effecting the corresponding pressure and velocity distributions thereover, the fillet 38 preferably varies in size and configuration between the opposite sides of each airfoil. For example, the fillet 38 is larger along the airfoil pressure side 20 than along the suction side 22 and changes or blends in size around the leading edge.

Furthermore, each of the platforms 16 includes a field or pattern of a plurality of film cooling holes 40 extending through the platform in a preferential location along the fillet 38 for discharging film cooling air 30 along the fillet during operation. The root fillet and platform holes 40 cooperate to reduce the adverse affects of the horseshoe vortices initiated at the leading edges of the airfoils.

For example, the large fillet 38 and field of platform cooling holes 40 may be used to reduce the size of the horseshoe vortices for reducing the turbulence generated therefrom and thereby reduce their adverse affect on the film cooling air being discharged from the platform holes during operation. The discharged film cooling air will enjoy improved film attachment with the outer surface of the platform for improving the cooling performance thereof. And the reduction in size of the horseshoe vortices will decrease their adverse affect on aerodynamic efficiency.

Figure 3:
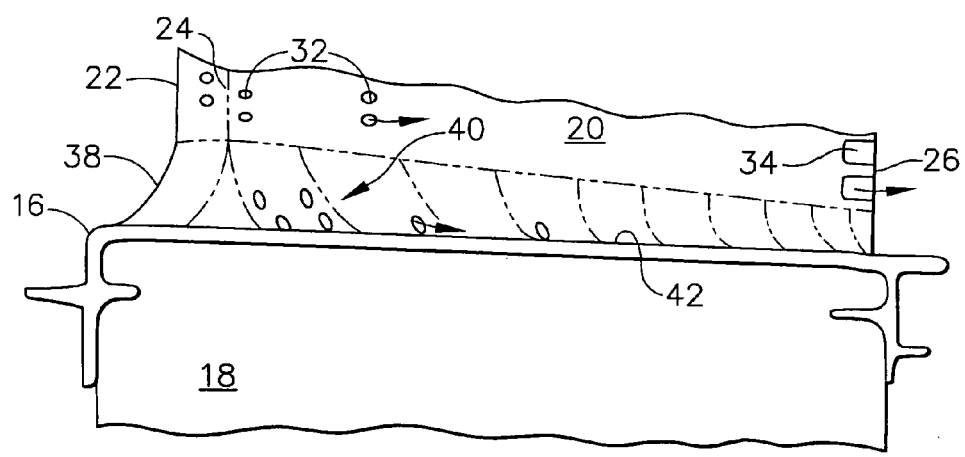
FIG. 3 is an enlarged side elevational view of the platform region at the root of the airfoil pressure side of one of the blades illustrated in FIG. 1 and taken along line 3—3.

FIGS. 1–3 illustrate several views of the root fillet 38 which preferentially varies in size from the leading edge 24 to the trailing edge 26 of the airfoil along the pressure side 20 thereof. As best shown in FIG. 2, the fillet 38 extends from the platform 16 greater or higher in radial span or elevation (+) on the pressure side 20 than on the suction side 22 along the forward portion thereof.

The fillet 38 may be defined by its radius of curvature in the circumferential direction and smoothly blends the junction of the root end of the airfoil with the platform in a concave arcuate profile. The fillet 38 is substantially larger in size or extent on the airfoil pressure side than on the suction side to correspond with the different pressure and velocity profiles of the combustion gases on the opposite sides of the airfoil.

FIG. 2 illustrates a circumferential section of the fillet 38. FIG. 3 illustrates the axial profile of the fillet 38 on the pressure side 20 of the airfoil. And, FIG. 4 is a top view of the fillet 38 schematically showing its variation in size and surface area in the platform 16 on the opposite sides of the individual airfoils 14.

A conventional blade platform is a symmetrical surface revolution around the axial centerline axis of the engine or turbine rotor forming circular arcs. In contrast, the root fillets 38 illustrated in FIGS. 2–4 blend with the outer surface of the platforms 16 and vary the surface contour thereof both circumferentially and axially.

Figure 4:
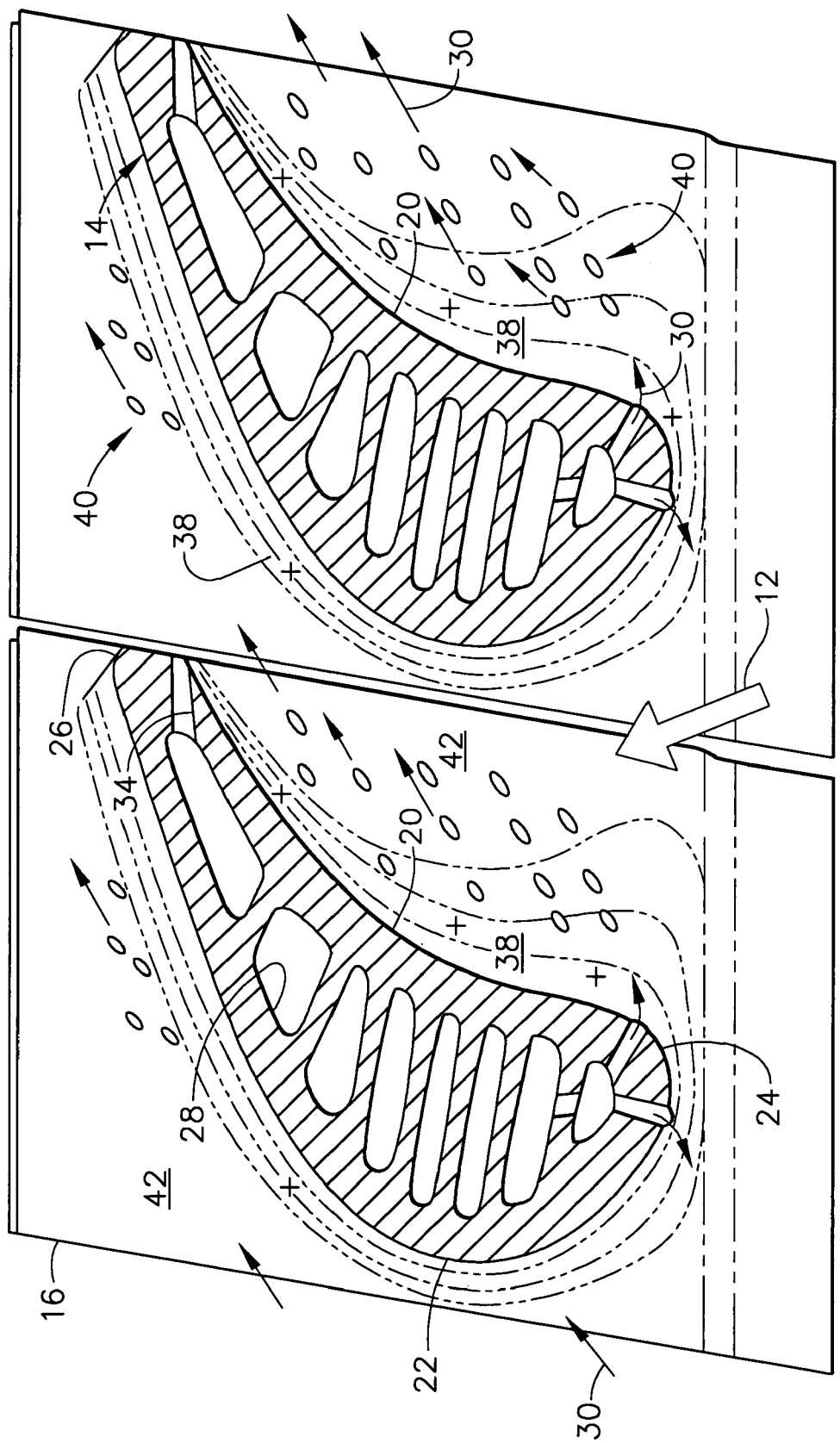
FIG. 4 is a partly sectional planiform view of the two blades illustrated in FIG. 1 and taken along line 4—4.

For example, the root fillet 38 illustrated in FIGS. 1 and 4 is generally funnel-shaped and decreases in size along the pressure side 20 from the leading edge 24 toward the trailing edge 26. This funnel-shaped fillet receives the pressure side horseshoe vortex at its inception at the leading edge and smoothly guides it in the downstream direction along the converging funnel fillet 38 toward the trailing edge.

Correspondingly, the field of platform holes 40 is preferentially located along the pressure side fillet 38 for discharging the film cooling air 30 in the downstream direction of the passage vortex. The cooling air is then discharged from the platform holes in the direction of the passage vortex as it is guided in the downstream direction by the funnel fillet 38. The discharged film cooling air will enjoy enhanced attachment to the outer surface of the platform for improving its cooling performance, with a corresponding reduction in mixing losses with the combustion gases flowable thereover during operation.

FIGS. 1 and 4 illustrate that the root fillet 38 decreases both in radius of curvature and coverage area on the platform 16 along the pressure side 20 from the airfoil leading edge 24 to the trailing edge 26. The corresponding funnel shape of the fillet 38 on the pressure side alters the pressure gradient of the combustion gases along the pressure side for in turn controlling the size and location of the pressure side vortex traveling downstream between the airfoils.

As indicated above, the fillet 38 is higher in elevation on the pressure side 20 than on the suction side 22 as illustrated in FIG. 2, and gradually decreases in height circumferentially from the pressure side of one airfoil to the suction side of the next adjacent airfoil 14. At the next airfoil, the pressure side portion of the platform meets the suction side portion of the next platform at the same nominal elevation.

More specifically, a conventional endwall or platform is axisymmetrical around the axial centerline axis of the engine with circular arcs around the perimeter of the platforms. The platforms 16 illustrated in FIGS. 1 and 4 for example each include a nominal outer surface 42 which is axisymmetrical in the conventional manner outside the bounds of the integral fillet 38.

The nominal surface 42 has a zero reference elevation corresponding with that of a conventional platform that bounds the radially inner end of the corresponding flow passage between airfoils. The fillet 38 therefore is introduced at the junction of the airfoil and platform as a radially outer increase in elevation designated by the plus-sign (+) illustrated in the Figures.

The elevated fillet 38 preferably blends smoothly in the circumferential direction with the nominal surface 42. The specifically configured root fillet 38 therefore locally changes the contour of the otherwise axisymmetrical platform outer surface solely within the coverage area of the fillet itself for specifically decreasing the adverse affects of the horseshoe vortices.

Since the pressure side 20 illustrated in FIG. 4 is concave and the suction side 22 is convex for effecting corresponding velocity and pressure distributions therealong for extracting energy from the combustion gases, the fillet 38 preferably remains substantially constant in size along the suction side 22 between the leading and trailing edges 24, 26.

However, the fillet 38 on the suction side then increases in size around the leading edge 24 to smoothly blend with the larger or taller fillet 38 along the pressure side 20. Correspondingly, the fillet 38 along the opposite pressure and suction sides also suitably blends with the platform at the airfoil trailing edge 26 where it typically adjoins the axial splitline of adjacent platforms.

In the preferred embodiment illustrated in FIG. 4, the fillet 38 has a substantially constant nominal radius of about 130 mils (3.3 mm) along the majority of the suction side from just behind the leading edge to just at the trailing edge where it decreases to about 60 mils (1.5 mm) around the trailing edge to the pressure side.

Correspondingly, the radius of the fillet 38 along the pressure side 20 near and just before the trailing edge 26 is substantially equal to the nominal radius along the suction side, and then increases to a maximum radius of about 500 mils (12.7 mm) along the pressure side near the leading edge. The fillet radius of curvature is best illustrated in the axial plane illustrated in FIG. 2 in one cross section.

The large fillet radius near the leading edge of the airfoils illustrated in FIG. 4 corresponds with the large surface coverage area of the fillet near the airfoil leading edge. The maximum radius of the fillet is substantially more than double the nominal radius near the trailing edge and along the suction side, and in the exemplary embodiment is about triple in radius. In this way, the large fillet near the leading edge may be effectively used for reducing the size and radial migration of the horseshoe vortices at their inception near the leading edge.

FIG. 4 also illustrates that the fillet 38 has a substantially constant coverage area on the platform 16 along the suction side 22. And, the corresponding coverage area of the fillet 38 along the pressure side 20 decreases from the leading edge 24 to the trailing edge 26, which corresponds with the decrease in associated radius of curvature.

The outer contour or profile of the fillet 38 generally matches those of the concave pressure side 20 and the convex suction side 22 of the airfoil at the root thereof. In this way, the fillet 38 remains an integral portion of the airfoil itself for achieving the desired velocity and pressure distributions therealong for extracting energy from the combustion gases with maximum efficiency. However, the fillet also blends smoothly with the integral platform 16 and provides an aerodynamically smooth transition therewith for further decreasing the adverse affects of the horseshoe vortices which flow along the platforms during operation.

The field of platform holes 40 illustrated in FIG. 4 cooperates with the contour of the root fillet 38 and is preferably disposed in part in the fillet 38 along the pressure side 20, and in part outside or outboard of the fillet 38 in the nominal surface 42 of the platform. On the suction side of the airfoil, the field of platform holes is preferably disposed in the entirety outside the smaller root fillet 38.

FIG. 2 illustrates that some of the platform holes 40 are preferably joined in flow communication with the internal cooling circuit 28 of the corresponding airfoil 14 for discharging spent cooling air therefrom. The spent cooling air flows from the platform holes 40 along the fillet 38, as illustrated in FIG. 4 for example, for energizing the boundary layer flow of the combustion gases 12 and weakening the horseshoe vortices in the flow passages 36.

Since some of the platform holes 40 extend through the fillet 38 as illustrated in FIG. 2, their outlets are disposed in the arcuate curvature of the fillet and discharge the spent cooling air downwardly along the fillet in the general direction of the passage vortex.

FIGS. 2 and 4 also illustrate that some of the platform holes 40 may extend radially through the platform 16 itself independent of the internal cooling circuit 28 inside the airfoil 16. The inlet ends of these platform holes are exposed in the underside of the platform outside the shank or dovetail region of the blade and may receive cavity or purge air 30 conventionally channeled in this region. The outboard portions of the platforms may thusly be additionally cooled by using this cooling air channeled through the platform.

Furthermore, the funnel form of the pressure side fillet 38 illustrated in FIG. 4 permits the field of platform film cooling holes 40 to be preferentially located to maximize their cooling effectiveness in the platform while also decreasing the adverse affects of the horseshoe vortices. The field of platform holes 40 is preferably spaced aft of the leading edge 24 along the airfoil pressure side 20 and forward of the trailing edge 26 generally in the midchord region of the airfoil.

In this way, as the horseshoe vortices are born at the airfoil leading edge, the platform holes 40 are preferably introduced for discharging cooling air initially along the largest extent of the fillet, and as the fillet converges in coverage area over the midchord region of the pressure side. The arcuate fillet cooperates with the platform film cooling holes to decrease the adverse effects of the horseshoe vortices including aerodynamic performance and cooling performance along the platform.

Correspondingly, the field of platform holes 40 along the airfoil suction side 22 is disposed near the trailing edge 26 closer thereto than to the leading edge and outside the coverage area of the suction side fillet 38. FIG. 4 illustrates that the pressure side portion of one platform circumferentially adjoins the suction side platform of the next airfoil, and therefore the film cooling air discharged from one platform continues over to the next platform. And, the field of platform film cooling holes may be preferentially located as illustrated to reduce the number thereof and the amount of cooling air discharged therefrom.

Various advantages may be achieved from specifically configuring the root fillet as indicated above with the cooperating field of platform film cooling holes. For example, the larger fillet at the airfoil leading edge along the pressure side creates a smooth, concave downward transition continuously to the nominal platform both circumferentially and axially toward the suction side of the next adjacent blade. The platform film cooling holes may preferentially be located in the arcuate fillet as well as in the nominal platform surface in the direction of the passage vortex for discharging film cooling air along the platform.

These features may be used to reduce the size of the horseshoe vortices, which in turn generate less turbulence, and reduce the heat transfer heating coefficient on the platform. The arcuate fillet also reduces the effective surface area of the platform subject to heating as compared with a platform with a substantially smaller fillet. Smaller passage vortices reduce aerodynamic losses and improve the cooling effectiveness of the air discharged from the platform film cooling holes.

Furthermore, the larger fillet joining the airfoil to the platform increases the cross sectional area of the metal substrate, and correspondingly reduces the nominal stresses therein. And, the large fillets improve the ability to cast the integral turbine blade in a one-piece assembly using conventional casting techniques.

Accordingly, the funnel-shaped root fillet and cooperating field of platform film cooling holes offer benefits in aerodynamic performance, heat transfer, stress, and manufacturing. The introduction of the root fillets 38 and platform holes 40 provides benefits in both aerodynamics and heat transfer and may be applied to other turbine stages, including turbine nozzles as well. In a turbine nozzle, the vane airfoils are integrally formed with radially outer and inner bands which define similar endwalls. The fillets and platform holes may be advantageously introduced at both endwalls of each vane for weakening the corresponding horseshoe vortices as they are created.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

The invention claimed is:

1. A turbine stage comprising:
    a row of airfoils integrally joined to corresponding platforms and spaced laterally apart to define respective flow passages therebetween for channeling gases;
    each of said airfoils including a concave pressure side and a laterally opposite convex suction side bounding an internal cooling circuit, and extending in chord between opposite leading and trailing edges;
    said airfoils being joined to said platforms at corresponding laterally arcuate fillets decreasing in size along said pressure side from said leading edge toward said trailing edge;
    each of said platforms including a nominal outer surface being axisymmetrical outside said fillet and blending circumferentially therewith; and
    a field of film cooling holes extending through said platform along said fillet for discharging film cooling air.

2. A turbine stage according to claim 1 wherein said fillet decreases in radius and area on said platform along said pressure side between said leading and trailing edges.

3. A turbine stage according to claim 2 wherein said fillet remains substantially constant in size along said suction side between said leading and trailing edges, and increases in size around said leading edge to blend with said larger fillet along said pressure side.

4. A turbine stage according to claim 3 wherein said fillet extends from said platform greater in height on said pressure side than on said suction side, and decreases in height circumferentially from said pressure side to said suction side of a next adjacent one of said airfoils.

5. A turbine stage according to claim 4 wherein said fillet has a substantially constant nominal radius along said suction side being substantially equal to the radius of said fillet along said pressure side before said trailing edge, and the radius of said fillet increases to a maximum radius along said pressure side near said leading edge.

6. A turbine stage according to claim 5 wherein said maximum radius of said fillet is more than double said nominal radius.

7. A turbine stage according to claim 4 wherein said fillet has a substantially constant coverage area on said platform along said suction side, and a corresponding coverage area along said pressure side decreasing between said leading and trailing edges.

8. A turbine stage according to claim 4 wherein said field of film cooling holes is disposed in part in said fillet along said pressure side, and in part outside said fillet in a nominal surface of said platform.

9. A turbine stage according to claim 8 wherein some of said film cooling holes are joined in flow communication with said cooling circuit for discharging cooling air along said fillet for energizing boundary layer flow of said gases and weakening horseshoe vortices in said flow passages.

10. A turbine stage according to claim 8 wherein said field of film cooling holes along said airfoil pressure side is spaced aft of said leading edge and forward of said trailing edge.

11. A turbine stage comprising:
a row of airfoils integrally joined to corresponding platforms and spaced laterally apart to define respective flow passages therebetween for channeling gases;
each of said airfoils including a concave pressure side and a laterally opposite convex suction side bounding an internal cooling circuit, and extending in chord between opposite leading and trailing edges;
said airfoils being joined to said platforms at corresponding laterally arcuate fillets decreasing in size along said pressure side from said leading edge toward said trailing edge; and
a field of film cooling holes extending through said platform along said fillet for discharging film cooling air.

12. A turbine stage according to claim 11 wherein said fillet decreases in radius and area on said platform along said pressure side between said leading and trailing edges.

13. A turbine stage according to claim 12 wherein said fillet extends from said platform greater in height on said pressure side than on said suction side, and decreases in height circumferentially from said pressure side to said suction side of a next adjacent one of said airfoils.

14. A turbine stage according to claim 13 wherein said platform includes a nominal outer surface being axisymmetrical outside said fillet and blending circumferentially therewith.

15. A turbine stage according to claim 13 wherein said fillet remains substantially constant in size along said suction side between said leading and trailing edges, and increases in size around said leading edge to blend with said larger fillet along said pressure side.

16. A turbine stage according to claim 15 wherein said fillet has a substantially constant nominal radius along said suction side being substantially equal to the radius of said fillet along said pressure side before said trailing edge, and the radius of said fillet increases to a maximum radius along said pressure side near said leading edge.

17. A turbine stage according to claim 16 wherein said maximum radius of said fillet is more than double said nominal radius.

18. A turbine stage according to claim 13 wherein said fillet has a substantially constant coverage area on said platform along said suction side, and a corresponding coverage area along said pressure side decreasing between said leading and trailing edges.

19. A turbine stage according to claim 13 wherein said field of film cooling holes is disposed in part in said fillet along said pressure side, and in part outside said fillet in a nominal surface of said platform.

20. A turbine stage according to claim 19 wherein some of said film cooling holes are joined in flow communication with said cooling circuit for discharging cooling air along said fillet for energizing boundary layer flow of said gases and weakening horseshoe vortices in said flow passages.

21. A turbine stage according to claim 19 wherein some of said film cooling holes extend radially through said platform independent of said cooling circuit inside said airfoil.

22. A turbine stage according to claim 19 wherein said field of film cooling holes along said airfoil pressure side is spaced aft of said leading edge and forward of said trailing edge.

23. A turbine stage according to claim 19 wherein said field of film cooling holes is disposed in part along said airfoil suction side near said trailing edge.

24. A turbine blade comprising:
an airfoil including a concave holes is disposed in part laterally opposite convex suction side bordering an internal cooling circuit, and extending in chord between opposite leading and trailing edges;
a platform integrally joined to a root end of said airfoil at an arcuate fillet decreasing in size along said pressure side from said leading edge toward said trailing edge; and
a field of film cooling holes extending through said platform along said fillet for discharging film cooling air.

25. A blade according to claim 24 wherein:
said fillet decreases in radius and area on said platform along said pressure side between said leading and trailing edges; and
said platform 16 includes a nominal outer surface being axisymmetrical outside said fillet and blending circumferentially therewith.

26. A blade according to claim 25 wherein said fillet extends from said platform greater in height on said pressure side than on said suction side of said airfoil.

27. A blade according to claim 26 wherein said fillet remains substantially constant in size along said suction side between said leading and trailing edges, and increases in size around said leading edge to blend with said larger fillet along said pressure side.

28. A blade according to claim 27 wherein:
said fillet has a substantially constant nominal radius along said suction side being substantially equal to the radius of said fillet along said pressure side before said trailing edge, and the radius of said fillet increases to a maximum radius along said pressure side near said leading edge; and
said fillet has a substantially constant coverage area on said platform along said suction side, and a corresponding coverage area along said pressure side decreasing between said leading and trailing edges.

29. A blade according to claim 28 wherein said field of film cooling holes is disposed in part in said fillet along said pressure side, and in part outside said fillet in a nominal surface of said platform.

30. A blade according to claim 29 wherein some of said film cooling holes are joined in flow communication with said cooling circuit for discharging cooling air along said fillet for energizing boundary layer flow of said gases and weakening horseshoe vortices in said flow passages.

* * * * *

UNITED STATES PATENT AND TRADEMARK OFFICE
CERTIFICATE OF CORRECTION

| | |
|---|---|
| PATENT NO. | : 7,249,933 B2 |
| APPLICATION NO. | : 11/035866 |
| DATED | : July 31, 2007 |
| INVENTOR(S) | : Ching-Pang Lee et al. |

It is certified that error appears in the above-identified patent and that said Letters Patent is hereby corrected as shown below:

Column 10, claim 24, line 13 thereof, delete "holes is disposed in part" and substitute therefor -- pressure side and a --.

Signed and Sealed this

Twentieth Day of November, 2007

JON W. DUDAS
*Director of the United States Patent and Trademark Office*